Figure 1:
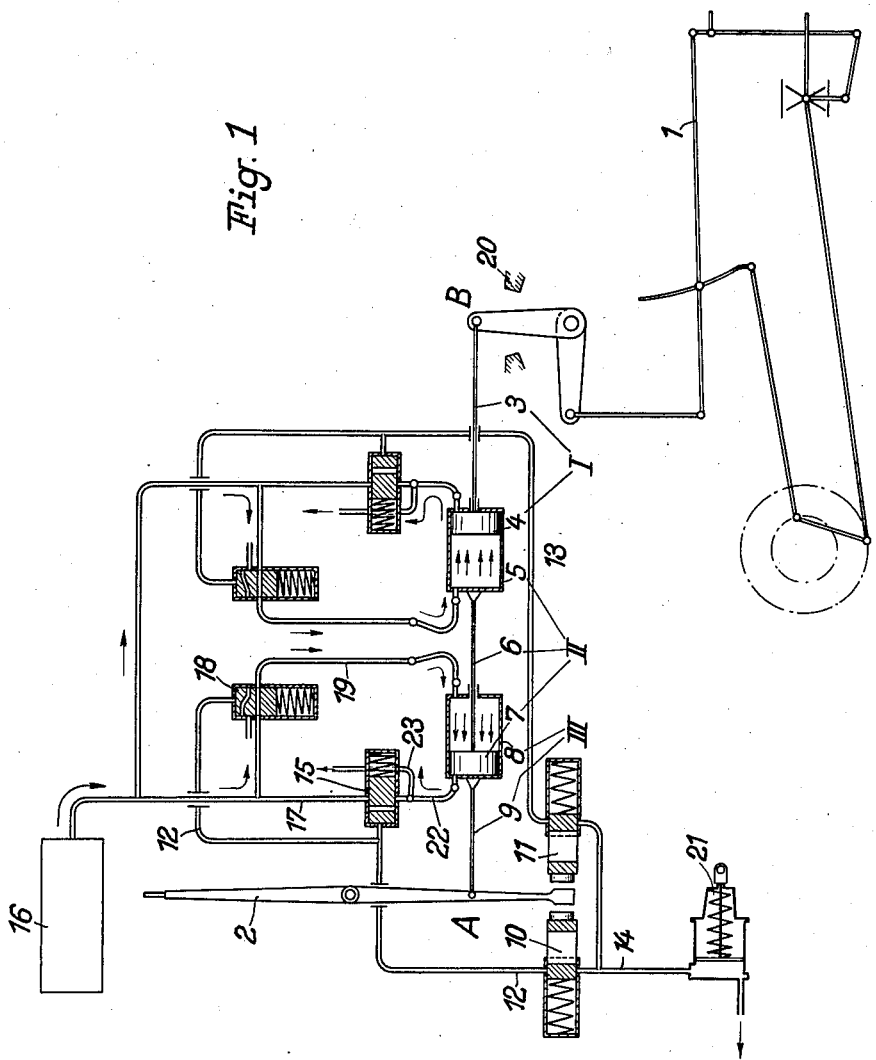

Aug. 6, 1940. K. EWALD 2,210,363
BRAKE FOR VEHICLES OPERATED BY STEAM-DRIVEN PISTON ENGINES
Filed March 21, 1939 2 Sheets-Sheet 1

Inventor:

Patented Aug. 6, 1940

2,210,363

UNITED STATES PATENT OFFICE 2,210,363

BRAKE FOR VEHICLES OPERATED BY STEAM-DRIVEN PISTON ENGINES

Kurt Ewald, Esslingen, Germany, assignor to Henschel & Sohn G. m. b. H., Kassel, Germany Application March 21, 1939, Serial No. 263,199
In Germany August 2, 1937

7 Claims. (Cl. 303—2)

Application was filed in Germany on August 2, 1937.

Vehicles, more particularly rail vehicles, for instance, locomotives, driven by steam-operated piston engines are at present almost exclusively braked by means of friction brakes which are usually provided with brake blocks and are operated either by the muscular force of the operator or by steam or air pressure. It is also usual to brake vehicles by means of air or steam counter-pressure brakes. In such brakes forces are produced, for instance in the steam cylinders, by suitable control operations, which act upon the steam engine pistons and consequently upon the whole driving gear in a direction opposite to the direction of travel of the vehicle. Such counter-pressure brakes are at present very rarely employed, and have hitherto been employed almost exclusive during downhill travel and particularly on fairly long runs of considerable slope, the employment of such counter-pressure brakes being additional to the employment of ordinary friction brakes.

The present day traffic conditions, however, are such that they cannot be satisfactorily met by the usual friction brakes alone. It has been found that in addition to the ordinary friction brake it is necessary to employ supplementary brakes. The counter-pressure brake is eminently suitable for use as an additional brake, as it is in most cases either directly available or easily obtainable in connection with the existing steam-operated piston engines, such counter-pressure brakes being, in fact, as regards their actions, simply reversed steam driven piston engines. The main obstacle to the general use of counter-pressure brakes lies in the complicated nature of their operation, which is a great drawback in view of the fact that particularly in the fast service and in heavy shunting operations, braking operations have to be carried out very rapidly. If, for instance, it is desired in connection with a locomotive to carry out a braking operation by means of a counter-pressure brake, this being at present practically the only case in which steam counter-pressure brakes are used, it is necessary to open the connection between the steam discharge pipe and the outer atmosphere and to reverse the valve gear so as to produce maximum steam admission in a direction opposite to the direction of the actual direction of travel of the vehicle. Upon termination of the braking operation, it is necessary to carry out suitable manipulations in the opposite sense. Now, in order to carry out these various operations it is obviously necessary for the locomotive driver to carry out various manual operations which require a considerable time and divert the driver's attention from other operations or matters of importance.

It is the object of the present invention to avoid entirely or simplify the various manipulations at present required for starting and terminating a braking operation by means of steam counter-pressure. For this purpose the various control means are, according to the invention, so associated positively with an existing power, for instance pressure air or steam, operated friction brake, that the counter-pressure brake is automatically brought into action upon or by the operation of the power brake.

The covering or closing of the blast pipe head before the starting of the braking operation and the subsequent re-opening of the blast pipe head after the completion of the braking, as well as the opening and the closing of the communication between the steam discharge pipe and the outer air, can be very easily effected by means of suitable control valves, for instance by means of steam or compressed air controlled by the locomotive driver-operated brake valve of the ordinary power brake, and the present invention, therefore, does not deal in detail with the means for carrying out these operations. On the other hand the invention deals fully with the automatic reversal of the valve gear required upon starting the braking operation and the setting of the valve gear to maximum admission or cut-out, in a sense opposite to the direction of travel, and in the subsequent return of the valve control to its initial position after the termination of the braking operation.

The change in the admission or cut-out, as well as the reversal of the gear to the opposite direction of travel, required for obtaining the counter-pressure braking action are usually effected by lifting or lowering a slide valve operating rod I, which is operated by the driver by reversing the reversing lever 2, which operates a control rod AB associated with the slide valve operating rod I. The reversing lever 2 is operated by the driver either directly by hand or by means of a control screw. In the usual constructions there corresponds to any particular position of the reversing lever 2, a definite position of the terminal point B of the rod AB and, therefore, also a definite direction of travel and a definite admission or cut-out of the cylinder. The present invention provides means for temporarily suspending this definite dependence of the position of the point B from the position of the reversing lever 2. This dependence is, by the present invention, so changed that it is possible to move the point B, at any position of the reversing lever 2 corresponding to a certain admission or cut-out, into a position corresponding to maximum admission in the opposite direction of travel.

Whereas in the ordinary constructions the length of the control rod AB is constant and invariable, the invention provides for a variation of the length of the rod. For this purpose the control rod is not, as usual, made in one part, but is made of three parts or sections. The control rod consists of a front section I, comprising the front rod section 3 and the piston 4 attached thereto; the middle section II consisting of the cylinder 5, the piston rod 6 and the piston 7, and finally the rear section III consisting of the cylinder 8 and the rear rod portion 9. In the basic or normal position, the control rod AB has the usual length corresponding to the length of the usual constant rod. This length is maintained by the fact that the pistons 4 and 7 are, by a suitable arrangement of ports and valves, pressed by steam or air pressure against the bottoms or covers of the cylinders 5 and 8 as shown in Figure 1. It is assumed in the illustrated constructional example that a supplemental counter-pressure brake is employed in combination with a compressed air operated ordinary brake. Substantially the same arrangement can be used if an ordinary steam pressure operated brake is used instead of a compressed air brake. If a suction air brake is to be used as the main brake, said air suction brake must be suitably modified in a manner obvious to any skilled person.

In the accompanying drawings, Fig. 1 shows the parts in the released position of the brake and in the middle position of the reversing lever.

Figure 2:
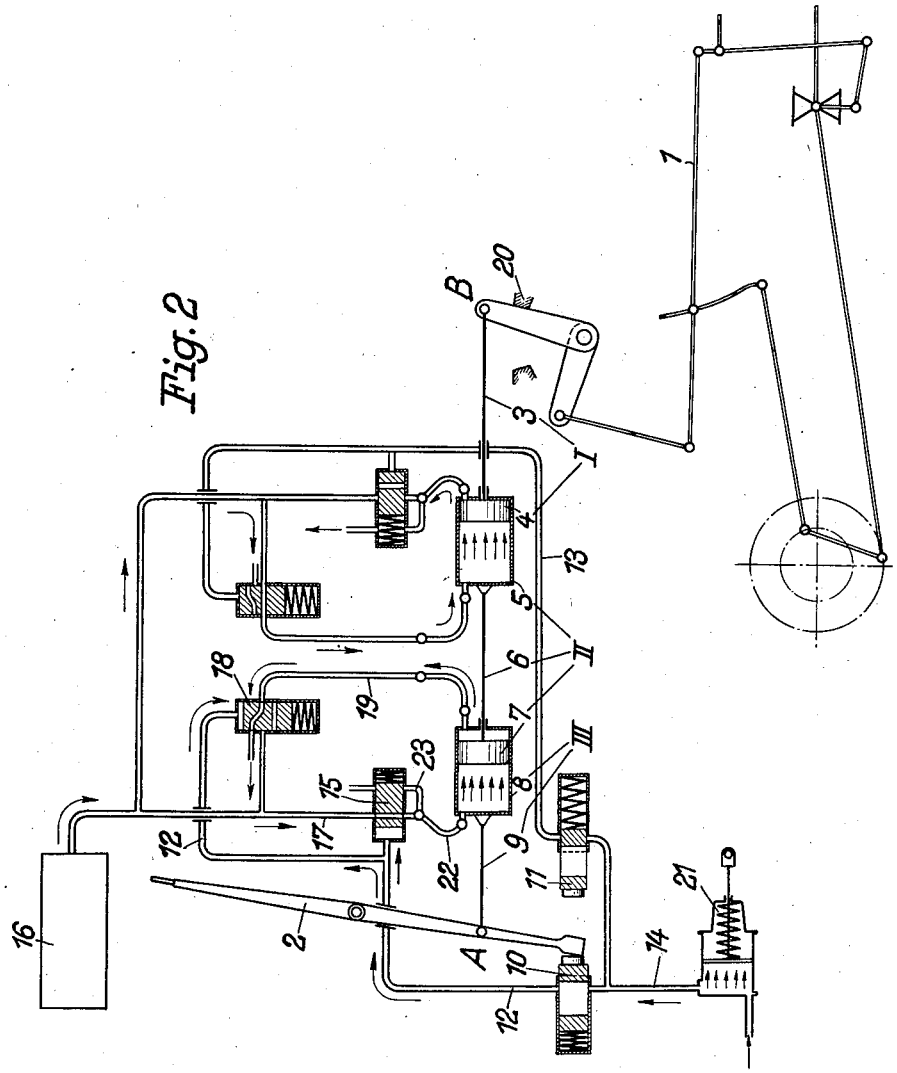

Fig. 2 shows the parts in the position corresponding to low admission for forward drive during the braking operation.

When the locomotive travels under steam pressure, the reversing lever 2 is moved from the middle position into a position corresponding to the required direction of travel and the required degree of admission or cut-out. Upon the reversing lever being moved from the middle position into a position corresponding to the usual minimum admission or cut-out, the lever moves by one of the striking surfaces formed thereon, according to the direction of drive required, either the valve 10 or the valve 11 from its normal position whereby either conduit 12 or conduit 13 is put into communication with a conduit 14. The conduit 14 being in communication with the outer atmosphere, compressed air cannot enter the conduit 12 or 13, although the valve 10 or 11 is open, and consequently the control rod AB maintains its original length. If now, on operating the ordinary power brake, highly compressed air is admitted into the conduit 14, said air passes also either into the conduit 12 or the conduit 13 and effects a change of the original length of the control rod AB.

During forward travel of the locomotive, for instance, the reversing lever 2 is moved forward with its upper end. The length of the control rod AB remaining unaltered, the point B is, therefore, moved rearwards from its middle position. In order to bring into action the counter-pressure brake, the point B should, however, be moved from its rear or middle position into the outermost forward position, in order to set the engine for maximum admission and rearward drive, and consequently the length of the control rod AB must, in order to bring the counter-pressure brake into action, be increased. This increase of the control rod is obtained in the following manner. The reversing lever operating the control rod, opens the valve 10. From conduit 14 now flows compressed air through the conduit 12, opens valve 15 and thereby enables compressed air to pass from the main compressed air container 16 through conduits 17 and 22 behind the piston 7. At the same time compressed air coming from the conduit 14 closes the valve 18. This valve 18 is so constructed that in its closed position it establishes communication between conduit 19 and the outer air. The air contained in the cylinder 8 and the conduit 19 can, therefore, upon the closing of the valve 18 escape through the valve 18 into the outer atmosphere. Consequently, over-pressure is produced in the cylinder 8 behind the piston 7, and the piston 7 is moved forwardly. The piston 7 on moving forwardly carries with it the cylinder 5 and the piston 4 contained in the cylinder 5 in the forward direction. This forward movement is limited by the step 20, which corresponds to maximum admission for reverse drive. The control is therefore now set in the manner required for putting into action the counter-pressure brake, that is for maximum admission for reverse drive, although the position of the reversing lever 2 has not been altered and said lever remains set for any desired admission and forward drive.

For the proper operation of the invention the conduit 14 must, for the duration of the braking operation of the power-operated brake, remain filled with compressed air, and must, upon releasing the power operated brake, be under the action of the outer air. This requirement can be fulfilled in various ways, for instance by connecting the conduit 14 directly to the brake cylinder 21 or to the conduit connecting the control valve and the brake cylinder 21.

On terminating the braking operation, the brake valve operated by the driver is so set as to cause compressed air to escape from the brake cylinder 21 and consequently also from the conduit 14 into the atmosphere. The compressed air contained in the conduit 12 or 13 can now escape through the conduit 14 into the open air. The valves 15 and 18 return into their initial positions and the air contained behind the piston 7 and in the conduit 22 escapes through the passage 23 into the atmosphere. Compressed air from the main container 16 passes through the valve 18 and the conduit 19 in front of the piston 7 and forces the same back against the bottom of the cylinder 8 into its rearward end position. The various parts of the control rod AB are, therefore, brought back into their positions corresponding to the original length of the control rod.

I claim:

1. In a vehicle, for instance a locomotive, driven by a steam driven piston engine, the combination of: a power brake controllable by the driver; a reversing gear for said vehicle; control means for actuating said reversing gear, said means including a rod of variable length consisting of a plurality of sections consisting of at least two cylinders and pistons arranged in series; driver-operated means for bodily moving said rod so as normally to actuate said gear and means, automatically operable upon operation of said power brake, for moving said cylinders and pistons with regard to one another to alter the length of said rod, and thereby actuate said reversing gear whereby an additional counter-pressure braking effort is produced.

2. In a vehicle, for instance a locomotive, driven by a steam driven piston engine, the combination of: a power brake controllable by the driver; a reversing gear for said vehicle; control means for actuating said reversing gear, said means including a rod of variable length consisting of a plurality of sections consisting of at least two cylinders and pistons arranged in series; driver-operated means for bodily moving said rod so as normally to actuate said gear and means automatically operable upon operation of said power brake for moving said cylinders and pistons with regard to one another to alter the length of said rod, and thus actuate said reversing gear and produce an additional counter-pressure braking effort, said means comprising a conduit for admitting and discharging a pressure medium to and from said cylinders; and valve means operable by the pressure medium of the power brake for controlling valves controlling the conduits admitting pressure medium to said cylinders.

3. In a vehicle, for instance a locomotive, driven by a steam driven piston engine, the combination of: a power brake controllable by the vehicle driver; a reversing gear for said vehicle; control means for actuating said reversing gear, said means including a rod of variable length having a section fixed to a cylinder, another section fixed to a piston and an intermediate section fixed to the piston of the first cylinder and the cylinder of the second piston; a driver-operated reversing lever for bodily moving said rod so as normally to actuate said gear; and means, automatically operable upon operation of said power brake, for moving said cylinders and pistons with regard to one another to alter the length of said rod and thereby actuate said reversing gear to produce an additional counter-pressure braking effort, said means comprising conduits for admitting and discharging pressure medium to and from said cylinders; valve means in said conduits; conduits for controlling said valve means by means of the pressure medium operating said power brake; and two valves in said last mentioned conduits operable by said driver-operated reversing lever of the reversing gear upon said lever being set from the zero position into forward or reverse position.

4. In a vehicle, for instance a locomotive, driven by a steam driven piston engine, the combination of: a power brake controllable by the driver; a reversing gear for said vehicle; control means for actuating said reversing gear, said means including a rod of variable length having a section fixed to a cylinder, another section fixed to a piston and an intermediate section fixed to the piston of the first cylinder and the cylinder of the second piston; a driver-operated reversing lever for bodily moving said rod so as normally to actuate said gear; and means, automatically operable upon operation of said power brake, for moving said cylinders and pistons with regard to one another to alter the length of said rod and thereby actuate said reversing gear to produce an additional counter-pressure braking effort, said means comprising conduits for admitting and discharging pressure medium to and from said cylinders; valve means in said conduits; conduits for controlling said valve means by means of the pressure medium operating said power brake; two valves in said last mentioned conduits operable by said driver-operated reversing lever of the reversing gear upon said lever being set from the zero position into forward or reverse position; and means for mechanically connecting the sections of said control rod.

5. In a vehicle, for instance a locomotive, driven by a steam driven piston engine, the combination of: a power brake controllable by the vehicle driver; a reversing gear for said vehicle; control means for actuating said reversing gear, said means including a rod of variable length having a section fixed to a cylinder, another section fixed to a piston and an intermediate section fixed to the piston of the first cylinder and the cylinder of the second piston; a driver-operated reversing lever for bodily moving said rod so as normally to actuate said gear; and means, automatically operable upon operation of said power brake, for moving said cylinders and pistons with regard to one another to alter the length of said rod and thereby actuate said reversing gear to produce an additional counter-pressure braking effort, said means comprising conduits for admitting and discharging pressure medium to and from said cylinders; valve means in said conduits; conduits for controlling said valve means by means of the pressure medium operating said power brake; two valves in said last mentioned conduits operable by said driver-operated reversing lever of the reversing gear upon said lever being set from the zero position into forward or reverse position; and means for automatically supplying pressure air contained in the brake cylinder of the vehicle to the power brake upon operation of the brake valve by the driver.

6. In a vehicle, for instance a locomotive, driven by a steam driven piston engine, the combination of: a power brake; a reversing mechanism for said engine for reversing the direction of drive of the vehicle; normal control means for said reversing mechanism; valve means for controlling the power brake operable by the driver and auxiliary means for actuating said reversing mechanism automatically operable, independently of the actuation of said normal control means, upon the operation of said valve means, whereby said piston engine is caused to produce a counter pressure braking effort for the purpose specified.

7. In a vehicle, for instance a locomotive, driven by a steam driven piston engine, the combination of: a power brake; a reversing mechanism for said engine for reversing the direction of drive of the vehicle; normal control means for said reversing mechanism; valve means for controlling the power brake operable by the driver and auxiliary means for actuating said reversing mechanism automatically operable, independently of the actuation of said normal control means, upon the operation of said valve means, whereby said piston engine is caused to produce a counter pressure braking effort for the purpose specified; and means for temporarily disconnecting said auxiliary actuating means from the power brake, comprising a conduit connecting the power brake cylinder and the control device of the auxiliary actuating means and valve means in said conduit.

KURT EWALD.